United States Patent
Shen et al.

(10) Patent No.: US 10,479,945 B2
(45) Date of Patent: Nov. 19, 2019

(54) ELECTRIC DESALTING AND DEHYDRATION APPARATUS

(71) Applicants: JIANGSU GOLDEN GATE ENERGY & EQUIPMENT CO., LTD, Jiangsu (CN); EAST CHINA UNIVERSITY OF SCIENCE AND TECHNOLOGY, Shanghai (CN)

(72) Inventors: Benxian Shen, Jiangsu (CN); Changsheng Jiang, Jiangsu (CN); Zuhu Liu, Jiangsu (CN); Yun Sun, Jiangsu (CN)

(73) Assignees: JIANGSU GOLDEN GATE ENERGY & EQUIPMENT CO., LTD, Jiangsu (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 15/742,044

(22) PCT Filed: Jun. 21, 2016

(86) PCT No.: PCT/CN2016/086614
§ 371 (c)(1),
(2) Date: Jan. 5, 2018

(87) PCT Pub. No.: WO2017/005089
PCT Pub. Date: Jan. 12, 2017

(65) Prior Publication Data
US 2018/0201846 A1    Jul. 19, 2018

(30) Foreign Application Priority Data

| Jul. 6, 2015 | (CN) | 2015 1 0389787 |
| Jul. 7, 2015 | (CN) | 2015 1 0389781 |
| Jul. 7, 2015 | (CN) | 2015 1 0389810 |

(51) Int. Cl.
C02F 1/463 (2006.01)
B01D 17/06 (2006.01)
(Continued)

(52) U.S. Cl.
CPC ............. *C10G 32/02* (2013.01); *B01D 17/06* (2013.01); *C02F 1/463* (2013.01); *C10G 31/08* (2013.01);
(Continued)

(58) Field of Classification Search
CPC ................................. B01D 17/06; C02F 1/463
See application file for complete search history.

(56) References Cited

U.S. PATENT DOCUMENTS 4,149,958 A * 4/1979 Martin ................... B01D 17/06
204/662
2014/0042028 A1   2/2014 Sams et al.

FOREIGN PATENT DOCUMENTS

| CN | 101104818 | 1/2008 |
| CN | 101104819 | 1/2008 |

(Continued)

OTHER PUBLICATIONS

Machine translation of CN201538757 of Ying et al. (Year: 2010).*
(Continued)

*Primary Examiner* — Brian W Cohen
(74) *Attorney, Agent, or Firm* — JCIPRNET (57) ABSTRACT

Provided is an electric desalting and dehydration apparatus, including an oil inlet distributor of an upper electric field, wherein the oil inlet distributor includes an oil inlet distributing pipe and an oil inlet branch pipe. The oil inlet distributing pipe is arranged in a water tray of an electric desalter, and below a ground electrode of the electric desalter. The oil inlet branch pipe is connected to the oil inlet distributing pipe to supply crude oil into the oil inlet
(Continued)

distributing pipe. The oil inlet distributing pipe is provided with oil outlets on both sides thereof in a horizontal direction. The distributor can uniformly distribute crude oil in a water tray, thus all of the crude oil is kept in an electric field for an equal time.

9 Claims, 12 Drawing Sheets

(51) Int. Cl.
*C10G 32/02* (2006.01)
*C10G 33/02* (2006.01)
*C10G 31/08* (2006.01)

(52) U.S. Cl.
CPC ....... *C10G 33/02* (2013.01); *C10G 2300/205* (2013.01)

(56) References Cited

FOREIGN PATENT DOCUMENTS

| | | |
|---|---|---|
| CN | 201538757 | 8/2010 |
| CN | 102061188 | 5/2011 |
| CN | 102373076 | 3/2012 |
| CN | 104987880 | 10/2015 |
| CN | 105154131 | 12/2015 |
| CN | 105176573 | 12/2015 |

OTHER PUBLICATIONS

Machine translation of CN102373076 of Benxian et al. (Year: 2012).*

"International Search Report (Form PCT/ISA/210)", dated Sep. 2016, with English translation thereof, pp. 1-6.

* cited by examiner

ELECTRIC DESALTING AND DEHYDRATION APPARATUS

CROSS-REFERENCE TO RELATED APPLICATION

This application is a 371 application of International PCT application serial no. PCT/CN2016/086614, filed on Jun. 21, 2016, which claims the priority benefit of China application no. 201510389787.X, filed on Jul. 6, 2015, and the priority benefit of China application no. 201510389810.5, filed on Jul. 7, 2015, and the priority benefit of China application no. 201510389781.2, filed on Jul. 7, 2015. The entirety of each of the abovementioned patent applications is hereby incorporated by reference herein and made a part of this specification.

BACKGROUND OF THE INVENTION

Field of the Invention

The present invention relates to the field of electric desalters, and in particular, to an electric desalting and dehydration apparatus.

Description of Related Art

Existing patents No. ZL200610091044.5, No. ZL200610091045.X, and No. ZL201010264495.0 disclose a novel electric desalting and dehydration system based on a concept of providing double oil inlets and double electric fields. A basic principle of the system is setting two electric fields in a same electric desalter, where oil is supplied to the electric fields separately. That is, a lower electric field is mounted on an inner central line (a position with the largest sectional area) of the electric desalter. The lower electric field is formed by a lower-field charged electrode and a lower-field ground electrode, where the two electrode plates may be horizontal electrodes, or may be designed to be perpendicular electrodes. An upper electric field is mounted above the lower electric field, and is formed by an upper-field charged electrode and an upper-field ground electrode. The upper electric field is provided with several electric field units, and a semi-closed water tray that fits each electric field unit is designed.

In an existing electric desalting apparatus with double oil inlets and double electric fields, an oil inlet distributor of an upper electric field supplies oil to an oil inlet sprayer in each water tray of the upper electric field through an oil inlet branch pipe. Because the pressure inside the oil inlet branch pipe slightly differs from the pressure inside the electric desalter, if oil is sprayed into an electric field by only using the sprayer, the resistance of spraying crude oil ejected from the sprayer in different directions is high. Thus, the crude oil cannot be sprayed to all sides and edges of the electric field, such that the crude oil cannot be distributed evenly in the electric field. As a result, the crude oil rises in the electric field at different speeds and stays in the electric field for different time lengths. Oil-water separation cannot be effectively performed on part of the crude oil that rises at high speed and stays for a short time in the electric field, thus affecting a desalting and dehydration effect of the electric desalting apparatus with double oil inlets and double electric fields. Consequently, operation of the apparatus cannot meet required technical indicators.

In addition, the crude oil contains a lot of silt and mechanical impurities, which may deposit at the bottom of the electric desalter in a desalting and dehydration process of the crude oil, and gradually stack into a pile. Worse still, they stack to a manhole of the electric desalter, and occupy effective space for saline wastewater at the bottom of the electric desalter. As a result, duration for which the saline wastewater stays inside the electric desalter is shortened, and then the crude oil contained in the saline wastewater does not have sufficient time to rise to an upper oil layer of the electric desalter. Accordingly, saline wastewater that is discharged out of the electric desalter carries a lot of crude oil, thus wasting the precious oil resource and polluting the environment.

In all existing sludge removal technologies, two or more backwash pipes are disposed at the bottom of the electric desalter, and multiple backwash nozzles are mounted on each backwash pipe. A backwash pump mounted outside the electric desalter is switched on regularly or irregularly. Flushed with backwash water, the silt and mechanical impurities at the bottom of the electric desalter are stirred up, and then are discharged out of the electric desalter through a drainage pipe disposed at the bottom of the electric desalter. Although the pressure of the backwash water is higher than the pressure in the electric desalter, because the electric desalter is filled with fluid, the backwash water encounters strong resistance when ejected. Therefore, silt and mechanical impurities that settle to a large area cannot be stirred up by flushing, thus failing to achieve an objective of flushing the sediment of the silt and mechanical impurities. Secondly, if the backwash pump is not switched on, because there is a distance between the drainage pipe and the bottom of the electric desalter, it is unlikely that the silt and mechanical impurities that deposit at the bottom of the electric desalter are discharged out of the electric desalter through the drainage pipe. Whether sludge and mechanical impurities deposit in the electric desalter or how high they deposit cannot be examined and determined. In this case, a backwash system can only be enabled by empirically or intuitively to perform flushing. When a large quantity of sludge and mechanical impurities deposit at the bottom of the electric desalter, the large quantity of sludge and mechanical impurities cannot be flushed out of the electric desalter even if the backwash system is enabled to perform flushing. Thus, normal operation of the electric desalting apparatus is affected, and duration for which the saline wastewater stays in the electric desalter is shortened. As a result, saline wastewater discharged out of the electric desalter carries a lot of crude oil, thus wasting precious oil resource and polluting the environment.

In the electric desalting and dehydration technology with double oil inlets and double electric fields, several square or rectangular semi-closed water trays are arranged in space above the inner central line of the electric desalter, and upper electric field units are mounted in the semi-closed water trays. Because the crude oil contains a lot of silt and mechanical impurities, they may deposit at to the bottoms of the water trays in a desalting and dehydration process of the crude oil. Generally, petrochemical facilities continuously operate three years for a cycle. Silt and mechanical impurities that deposit on tilted plates at the bottoms of the water trays in this period gradually form high stack layers. The stack layers occupy the limited space at the bottoms of the water trays, and further affect normal operation of the upper electric field.

SUMMARY OF THE INVENTION

An objective of the present invention is to solve the problems in the prior art, and provide an electric desalting and dehydration apparatus.

To achieve the foregoing technical objective, the present invention adopts the following technical solution:

An electric desalting and dehydration apparatus includes an oil inlet distributor of an upper electric field, where the oil inlet distributor includes an oil inlet distributing pipe and an oil inlet branch pipe. The oil inlet distributing pipe is arranged in a water tray of an electric desalter, and below a ground electrode of the electric desalter. The oil inlet branch pipe is connected to the oil inlet distributing pipe to supply crude oil into the oil inlet distributing pipe. The oil inlet distributing pipe is provided with oil outlets on both sides thereof in a horizontal direction.

As a further preferred solution of the present invention, the apparatus further includes an upper-field water-tray automatic sand flushing device, where the upper-field water-tray automatic sand flushing device is connected to the water tray in the electric desalter, and includes an automatic sand removal plate, a backwash inlet pipe, backwash pipes, sprayers, and a downpipe. The automatic sand removal plate is provided on an upper side of a bottom surface of the water tray and below the oil inlet distributing pipe. The water tray is V-shaped, and correspondingly, a trough is formed at the bottom of the water tray. The backwash pipes are provided above the automatic sand removal plate, and the sprayers are evenly distributed on each backwash pipe. The backwash inlet pipe is connected to the backwash pipes to supply water to the backwash pipes. The downpipe is connected to the trough at the bottom of the water tray.

As a further preferred solution of the present invention, the apparatus further includes a bottom automatic sand flushing device. The bottom automatic sand flushing device is provided at the bottom of the electric desalter, and includes an automatic sand removal plate, a backwash pipe group, a backwash inlet pipe, an on/off valve, sprayers, an ultrasonic sludge interface instrument, and an automatic control system. The automatic sand removal plate is fixedly provided at the bottom of an inner wall of the electric desalter. The backwash pipe group is provided inside the electric desalter and above the automatic sand removal plate, and includes several backwash pipes. The sprayers are evenly provided on each backwash pipe. The backwash inlet pipe is connected to the backwash pipes. The on/off valve is provided in the backwash inlet pipe. The ultrasonic sludge interface instrument is provided at the bottom of the electric desalter, and is used for detecting the thickness of silt that settles in the electric desalter. The ultrasonic sludge interface instrument and the on/off valve are both in signal connection with the automatic control system. When the ultrasonic sludge interface instrument detects that the thickness of the silt that settles at the bottom of the electric desalter exceeds a threshold, the automatic control system switches on the on/off valve, to flush the silt at the bottom of the electric desalter.

As a further preferred solution of the present invention, the oil inlet distributing pipes in the oil inlet distributor of the upper electric field are symmetrically distributed about a radial central line of the water tray, and one or two oil inlet distributing pipes are arranged on each side.

As a further preferred solution of the present invention, the diameter of each of the oil outlets of the oil inlet distributor of the upper electric field is less than that of the oil inlet distributing pipe.

As a further preferred solution of the present invention, several groups of oil inlet distributing pipes in the oil inlet distributor of the upper electric field are arranged according to the length of the electric desalter, and are located in the water trays of the electric desalter, where the water trays correspond to the oil inlet distributing pipes in a one-to-one manner.

As a further preferred solution of the present invention, the automatic sand removal plate in the upper-field water-tray automatic sand flushing device is a thin polytetrafluoroethylene (PTFE) plate, and the automatic sand removal plate is adhered to the bottom surface of the water tray.

As a further preferred solution of the present invention, several bolts are welded at the bottom of the water tray in the upper-field water-tray automatic sand flushing device, and the automatic sand removal plate is fixedly disposed at the bottom of the water tray by using several nuts and a press plate.

As a further preferred solution of the present invention, the backwash pipes in the upper-field water-tray automatic sand flushing device are symmetrically distributed about a radial central line of the water tray, and two or more backwash pipes are arranged on each side.

As a further preferred solution of the present invention, an anti-vortex baffle is disposed at a top end of the downpipe of the upper-field water-tray automatic sand flushing device.

The oil inlet distributor of the upper electric field provided in the apparatus of the present invention changes an oil inlet manner in which oil is sprayed to an electric filed with an oil inlet sprayer. The oil inlet distributor is disposed in each water tray and located at a lower part of an electric field. The distributor can evenly distribute crude oil to the water trays and make the crude oil rise at a constant speed layer by layer, the crude oil being allocated to each upper electric field unit and having not been desalted and dehydrated. In this way, the crude oil that has not been desalted and dehydrated rises at an equal speed in the electric field, and is kept in the electric field for an equal time, thus ensuring that the crude oil treated in the upper electric field is qualified, and further ensuring that the operation of an electric desalting apparatus with double oil inlets and double electric fields meets required technical indicators.

The apparatus of the present invention can remove silt and mechanical impurities from the bottom of an upper water tray; ensure a continuous, normal, and stable operation of the upper electric field; and ensure a desalting effect of the upper electric field, such that the treated crude oil meets the technical indicators, and an oil content in discharged wastewater reaches or is higher than the standard, thus reducing environmental pollution and saving the petroleum resource.

The apparatus of the present invention can further implement automatic sand removal, reduce the sediment of the silt and mechanical impurities on the automatic sand removal plate at the bottom of the electric desalter, and reduce the frequency of backwashing. Moreover, the apparatus can automatically detect the thickness of a sludge layer at the bottom of the electric desalter on line, and automatically enable a backwash system to perform flushing, such that the electric desalting apparatus can normally operate for a long cycle, and the oil content in the discharged wastewater reaches the standard, thus reducing environmental pollution and saving the petroleum resource.

DETAILED DESCRIPTION OF THE EMBODIMENTS

The present invention is further described below with reference to the accompanying drawings and embodiments of the specification.

Embodiment 1

Figure 1:
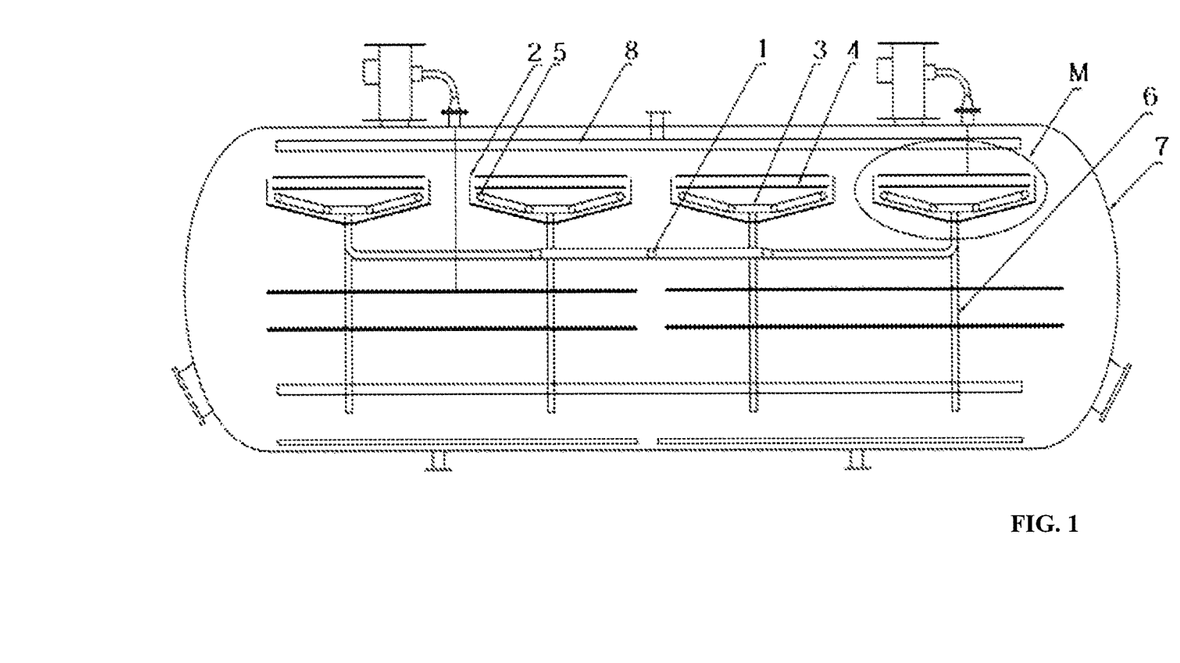
FIG. 1 is a schematic structural diagram of Embodiment 1 of the present invention.
Figure 2:
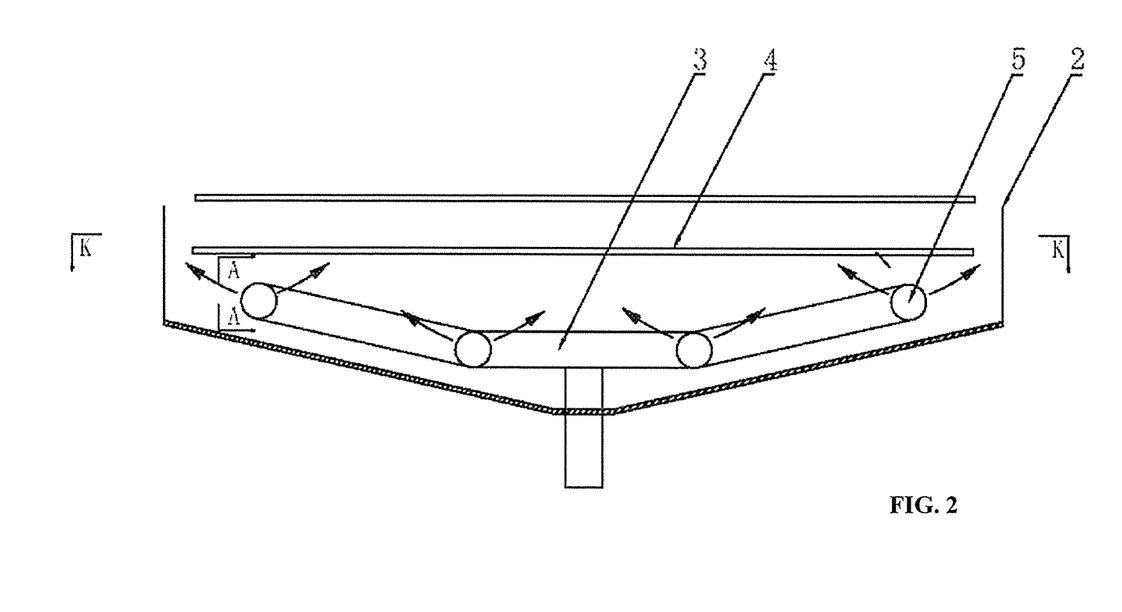
FIG. 2 is a schematic partial structural diagram of a part M marked in FIG. 1.
Figure 3:
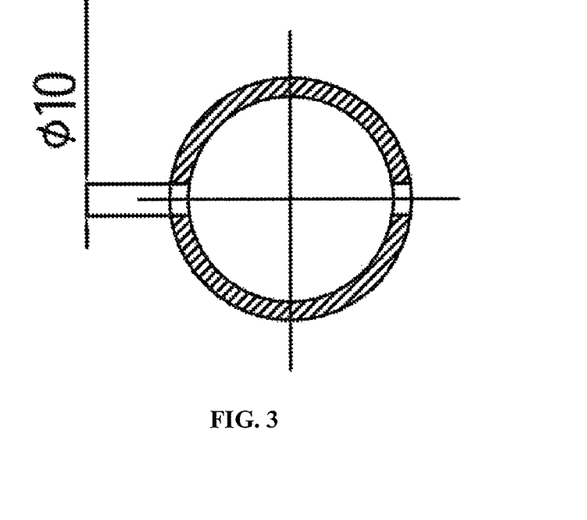
FIG. 3 is a sectional view along A-A shown in FIG. 2.
Figure 4:
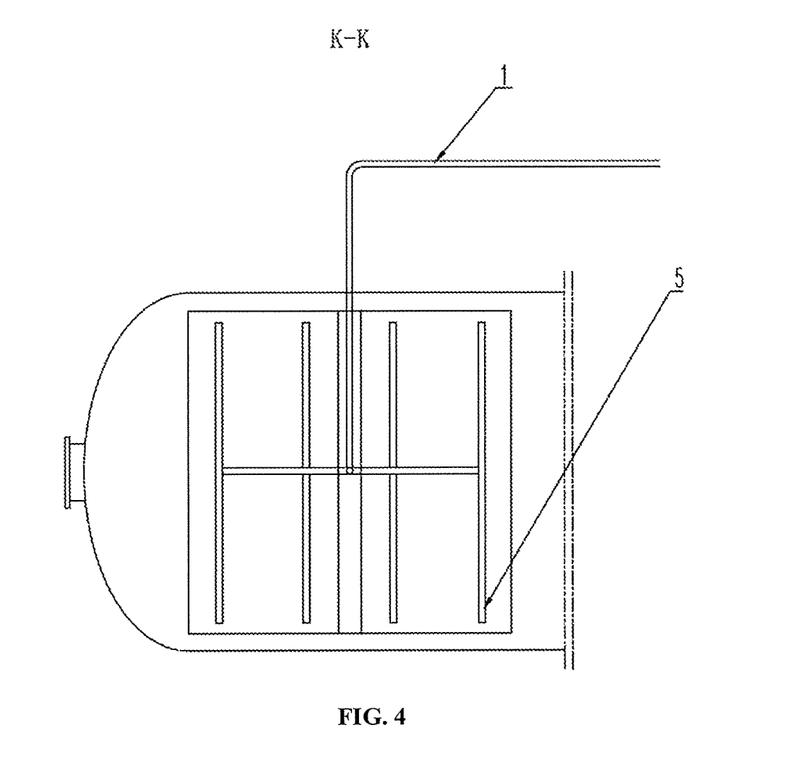
FIG. 4 is a sectional view along K-K shown in FIG. 2.

As shown in FIG. 1, crude oil is allocated to an oil inlet distributor 3 in each water tray 2 through an oil inlet branch pipe 1. The oil inlet distributor 3 is arranged inside each water tray 2, is mounted below a ground electrode 4 in the water tray 2, and is kept at a distance from the ground electrode 4. In a possible case, this distance is as large as possible. Referring to FIG. 1, FIG. 2, and FIG. 3, oil inlet distributing pipes 5 are symmetrically distributed about a radial central line of the water tray 2, and one or two oil inlet distributing pipes 5 are arranged on each side. Referring to FIG. 2, the number of the arranged oil inlet distributing pipes 5 is determined according to the size of the water tray 2, to ensure that the crude oil can be evenly distributed to the water trays and rises at a constant speed layer by layer. The oil inlet distributing pipe 5 is provided with several oil outlets on both sides thereof in a horizontal direction. The number of the opened oil outlets and the size of each are determined through calculation with the objective of ensuring that the crude oil is evenly distributed in both an axial direction and a radial direction. Referring to FIG. 3 and FIG. 4, an inner diameter of each of the oil outlets is at least 10 mm. To ensure that oil flows through the outlets are uniform in an axial direction, a flow rate $W_k$ through each outlet may be made to be greater than a flow rate inside the oil inlet distributing pipe 5, or distances between the outlets may be made to be unequal and diameters thereof are varied.

Refer to FIG. 1 to FIG. 4 for a working process and principle of this embodiment. Crude oil that is allocated to an upper electric field and has not been desalted and dehydrated is supplied through the oil inlet branch pipe 1 to each oil inlet distributor 3 mounted in the water tray 2. The oil inlet distributor 3 evenly allocates the crude oil that has not been desalted and dehydrated to each oil inlet distributing pipe 5. The oil inlet distributing pipes 5 are symmetrically distributed about a radial central line of the water tray 2, and one or two oil inlet distributing pipes 5 are arranged on each side. The number of the arranged oil inlet distributing pipes 5 is determined according to the size of the water tray 2, to ensure that the crude oil can be evenly distributed to the water trays and rise at a constant speed layer by layer. The oil inlet distributing pipe 5 is provided with several oil outlets on both sides thereof in a horizontal direction. The number of the opened oil outlets and the size of each are determined through calculation with the objective of ensuring that the crude oil is evenly distributed in both an axial direction and a radial direction. To ensure that oil flows through the outlets are uniform in an axial direction, a flow rate $W_k$ through each outlet may be made to be greater than a flow rate inside the oil inlet distributing pipe 5, or distances between the outlets may be made to be unequal and diameters thereof are varied. Because the flow rate $W_k$ through each outlet is greater than the flow rate inside the oil inlet distributing pipe 5, the crude oil ejected from each outlet can be distributed in a particular range. Thus, by using the oil inlet distributor 3, the crude oil that has not been desalted and dehydrated is evenly distributed to the water trays 2, rises at a constant speed layer by layer, passes through the grid-shaped ground electrode 4, and enters the upper electric field. Under the force of the electric field, saline water drops coalesce into big water drops. The big saline water drops deposit because of a density difference between oil and water, are drained to the bottom of an electric desalter 7 through a downpipe 6 below the water tray 2, and are eventually discharged out of the electric desalter 7. The crude oil from which the saline water drops are removed rises and is guided out the electric desalter 7 through an oil collection pipe 8. The crude oil that has not been desalted and dehydrated can be evenly distributed to the water trays 2 and rises at a constant speed layer by layer. Therefore, the crude oil that has not been desalted and dehydrated rises at an equal speed in the electric field, and is kept in the electric field for an equal time, thus ensuring that operation of an electric desalting apparatus with double oil inlets and double electric fields meets required technical indicators.

Embodiment 2

The only difference between Embodiment 1 and Embodiment 2 is that, the apparatus of this embodiment is further provided with an upper-field water-tray automatic sand flushing device.

Figure 5:
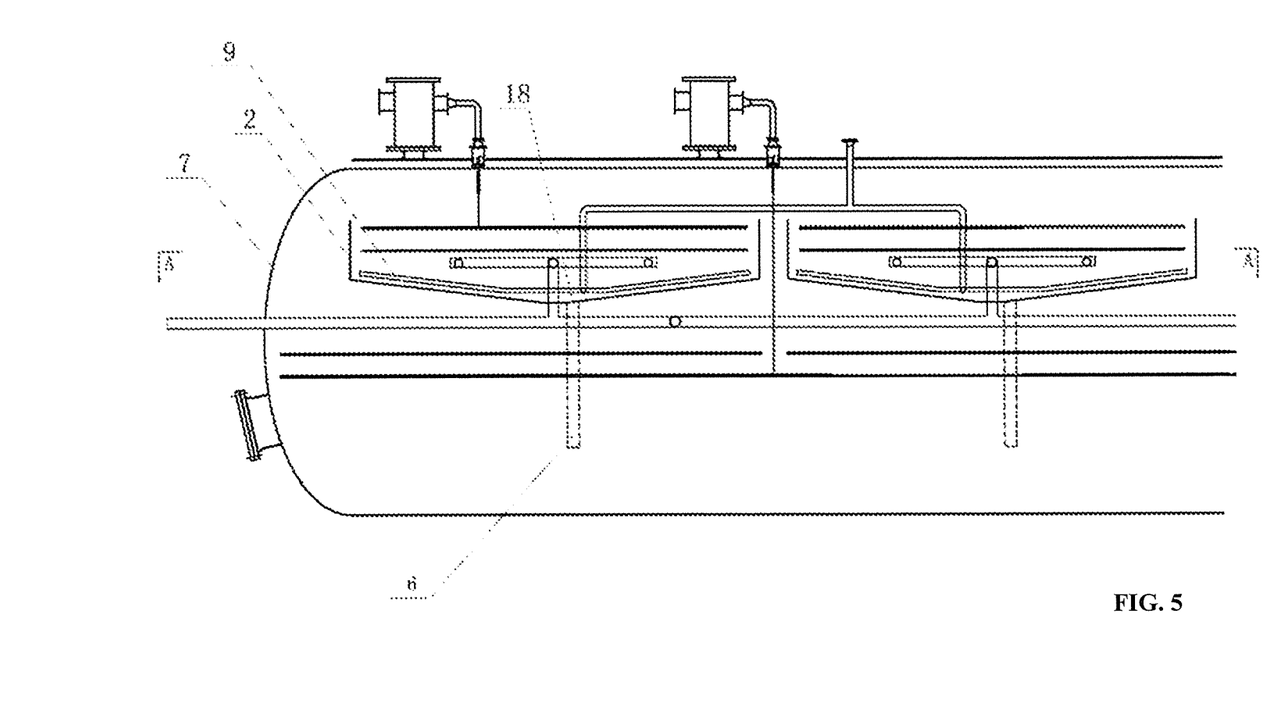
FIG. 5 is a schematic structural diagram of Embodiment 2 of the implementation model.
Figure 6:
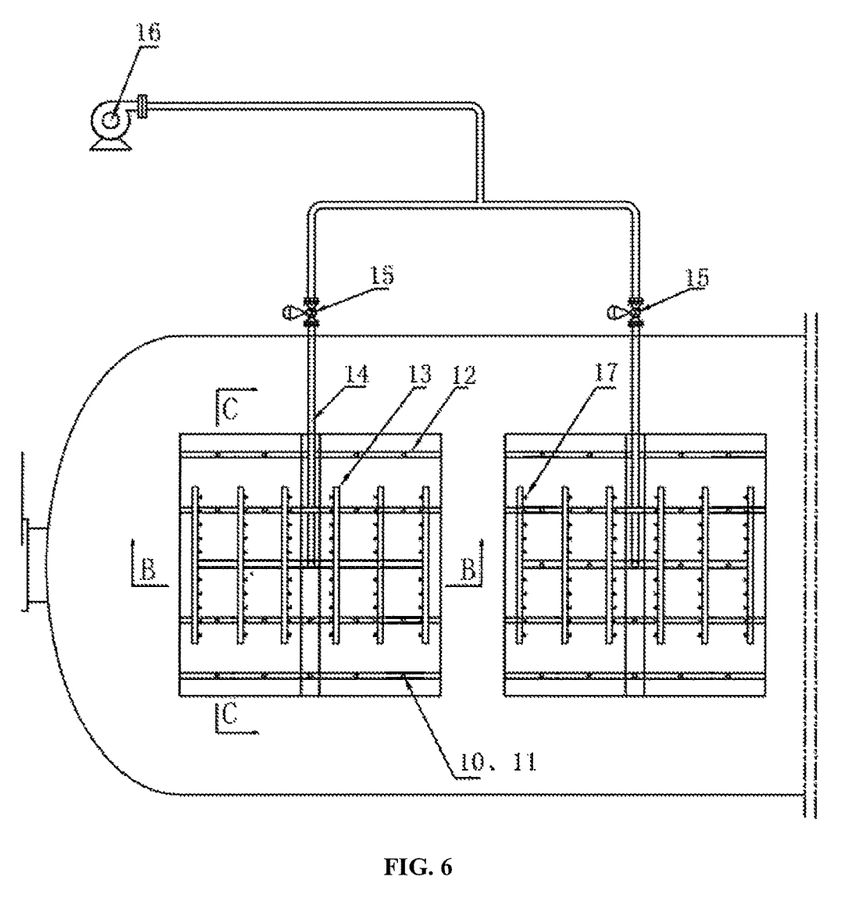
FIG. 6 is a sectional view along A-A shown in FIG. 5.
Figure 7:
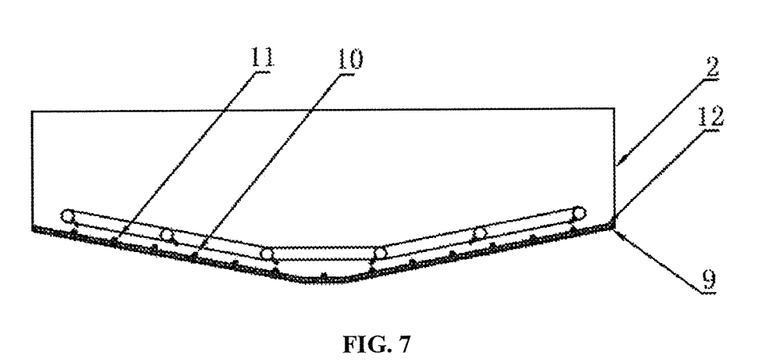
FIG. 7 is a sectional view along B-B shown in FIG. 6.
Figure 8:
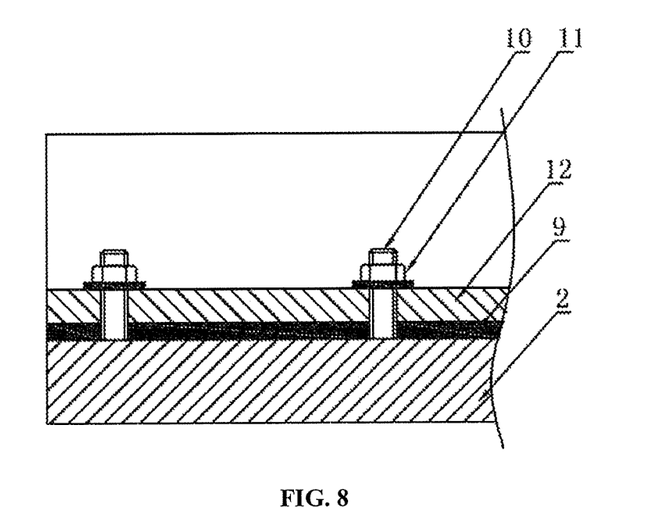
FIG. 8 is a sectional view along C-C shown in FIG. 6.

As shown in FIG. 5, a bottom surface of each water tray 2 is clad with an automatic sand removal plate 9. The automatic sand removal plate 9 is a thin PTFE plate, or is spray-coated with PTFE. The thickness of the thin PTFE plate or the PTFE coating is determined according to a degree at which silt and mechanical impurities that have settled abrade the surface of the automatic sand removal plate, and according to designed service life. The thin PTFE plate may be adhered to the bottom surface of the water tray 2 after its surface is treated. Alternatively, several bolts 10 may be welded at the bottom of each water tray 2, and the thin PTFE plate is pressed at the bottom of each water tray 2 by using nuts 11 and a press plate 12, as shown in FIG. 8. Several backwash pipes 13 are mounted at the bottom of each water tray 2. The backwash pipes 13 are symmetrically distributed about a radial central line of the water tray 2, and two or more backwash pipes 13 are arranged on each side. The number of the arranged backwash pipes 13 is determined according to the area of the bottom of the water tray 2, to ensure that the backwash pipes 13 flush the bottom of the water tray 2 without dead corners. Each backwash pipe 13 is connected to a backwash inlet pipe 14. Electric or pneumatic on/off valves 15 are mounted outside the backwash inlet pipe 14, and each of the electric or pneumatic on/off valves 15 is connected to a water outlet of a backwash pump 16 through a pipeline, as shown in FIG. 6. The backwash pipes 13 are closely attached to the automatic sand removal plate 9, and an interval between the bottom of each backwash pipe 13 and the automatic sand removal plate 9 is about 25 mm. Several sprayers 17 are welded on each backwash pipe 13, and are spaced at 300 mm to 400 mm. An included angle between each sprayer and each horizontal line is 30° to 60°. A pipe diameter of the backwash pipe 13 is calculated according to a flow quantity and a flow rate of backwash water. A cross section of the water tray is V-shaped, and therefore a trough is formed at the bottom of the water tray 2. The trough is connected to one or two downpipes 6. A pipe diameter of the downpipe 6 is calculated according to the amount of the backwash water. An anti-vortex baffle 18 is disposed at a top end of the downpipe 6.

For an electric desalting and dehydration apparatus with double oil inlets and double electric fields, in a desalting and dehydration process of the crude oil in an upper electric field, suspended particulates such as some stubborn silt and mechanical impurities in the crude oil settle on the automatic sand removal plate 9 at the bottom of the water tray 2. The automatic sand removal plate 9 is made of PTFE. Because PTFE has a characteristic that no substance can stick to PTFE and has a superior self-lubrication property, the silt and mechanical impurities that settle on the automatic sand removal plate 9 at the bottom of the water tray 2 can be automatically drained to the bottom of the electric desalter 7 with saline wastewater through the downpipe 6 at the bottom of the water tray 2, and are eventually discharged out of the electric desalter 7. Because the anti-vortex baffle 18 is disposed at a top end of the downpipe 6, vortices are not produced while the saline wastewater is discharged. When an automatic control system switches on the backwash pump 16 to flush the silt and mechanical impurities that deposit at the bottom of the electric desalter 7, the stubborn silt and mechanical impurities that deposit at the bottom of each water tray 2 in the upper electric field are also flushed at the same time. The automatic control system switches on/off the electric or pneumatic on/off valves 15 via an instruction, to flush the bottom of each water tray 2 with water through the backwash pipes 13. Under the disturbance of the backwash water, the stubborn silt and mechanical impurities that deposit on the automatic sand removal plate 9 at the bottom of the water tray 2 are stirred up, are drained to the bottom of the electric desalter 7 with the saline wastewater through the downpipe 6 at the bottom of the water tray 2, and are eventually discharged out of the electric desalter 7.

In this embodiment, the bottom of the water tray 2 is clad with the automatic sand removal plate 9, where the automatic sand removal plate 9 is made of PTFE. Because PTFE has a characteristic that no substance can stick to PTFE and has a superior self-lubrication property, the silt and mechanical impurities that settle on the automatic sand removal plate 9 at the bottom of the water tray 2 can be automatically drained to the bottom of the electric desalter 7 with the saline wastewater through the downpipe 6 at the bottom of the water tray 2, and are eventually discharged out of the electric desalter 7. The silt and mechanical impurities rarely deposit on the automatic sand removal plate 9 at the bottom of the water tray 2, thus reducing the frequency of backwashing. Because the anti-vortex baffle 18 is disposed at a top end of the downpipe 6, vortices are not produced while the saline wastewater is discharged. When an automatic control system switches on the backwash pump 16 to flush the silt and mechanical impurities that deposit at the bottom of the electric desalter 7, the stubborn silt and mechanical impurities that deposit at the bottom of each water tray 2 in the upper electric field are also flushed at the same time. The automatic control system switches/off the electric or pneumatic on/off valves 15 via an instruction, to flush the bottom of each water tray 2 with water through the backwash pipes 13. Under the disturbance of the backwash water, the stubborn silt and mechanical impurities that deposit on the automatic sand removal plate 9 at the bottom of the water tray 2 are stirred up, are drained to the bottom of the electric desalter 7 with the saline wastewater through the downpipe 6 at the bottom of the water tray 2, and are eventually discharged out of the electric desalter 7.

Embodiment 3

The only difference between this embodiment and Embodiment 1 is that, the apparatus of this embodiment further includes a bottom automatic sand flushing device.

Figure 9:
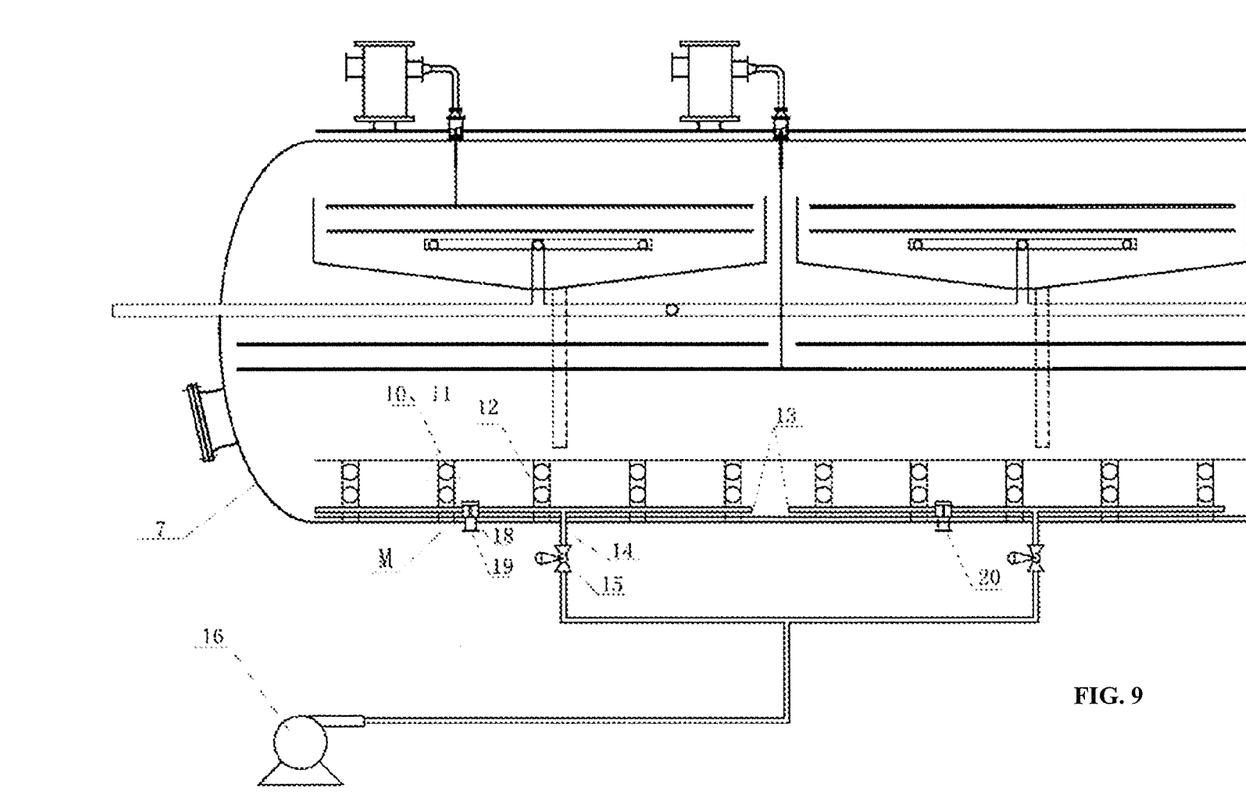
FIG. 9 is a schematic structural diagram of Embodiment 3 of the implementation model.
Figure 10:
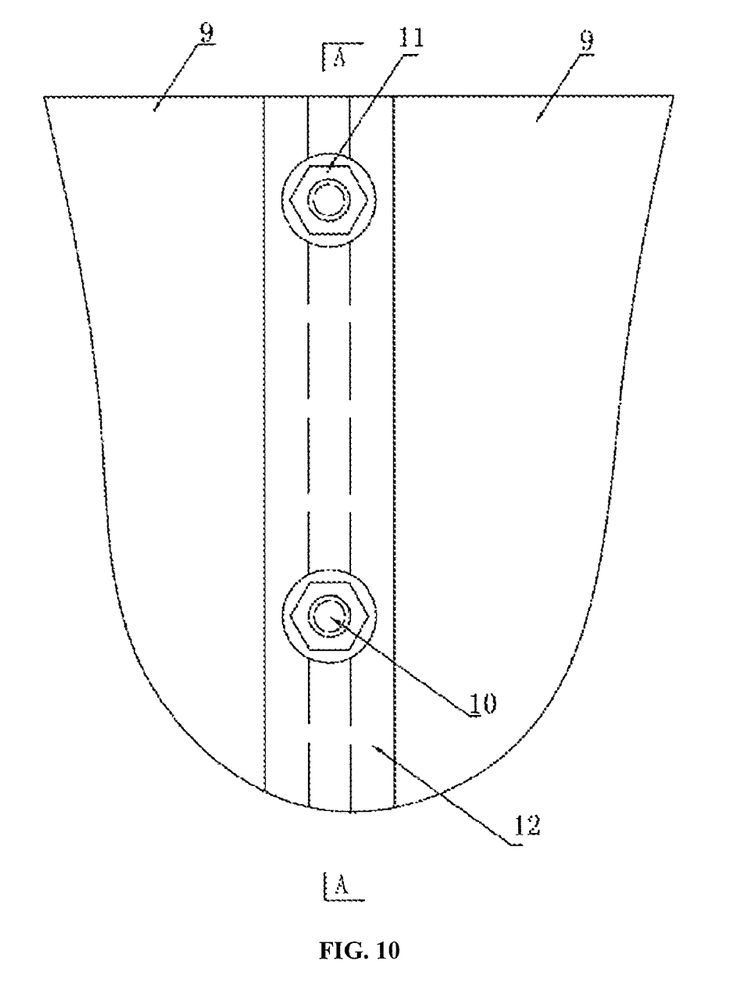
FIG. 10 is a schematic partial structural diagram of a part M marked in FIG. 9.
Figure 11:
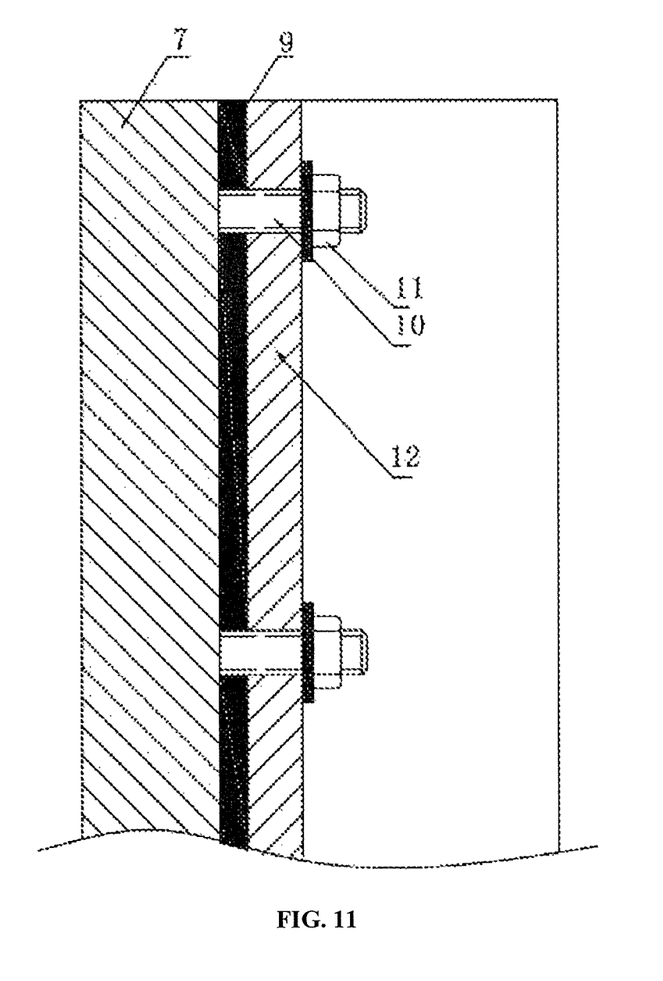
FIG. 11 is a sectional view along A-A shown in FIG. 10.
Figure 12:
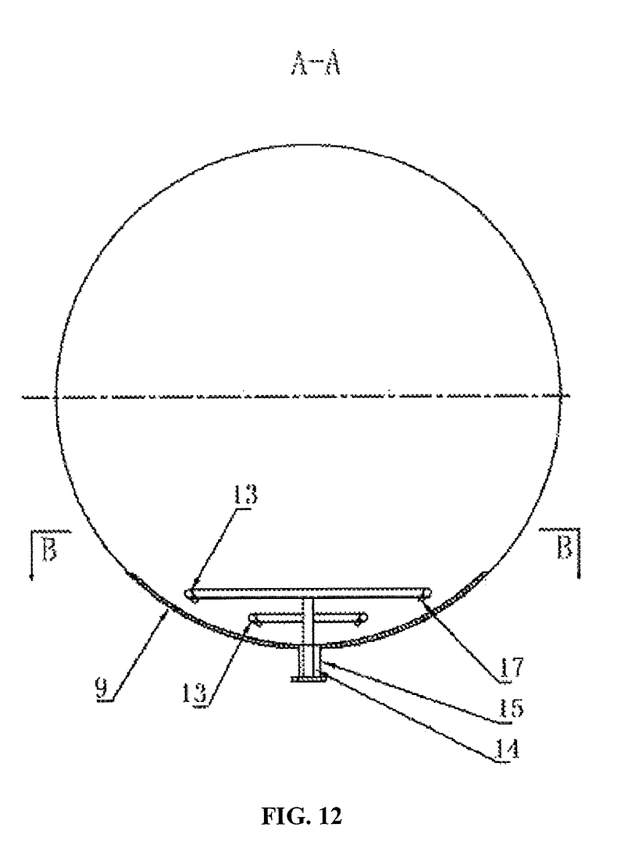
FIG. 12 is a sectional view along A-A shown in FIG. 9.
Figure 13:
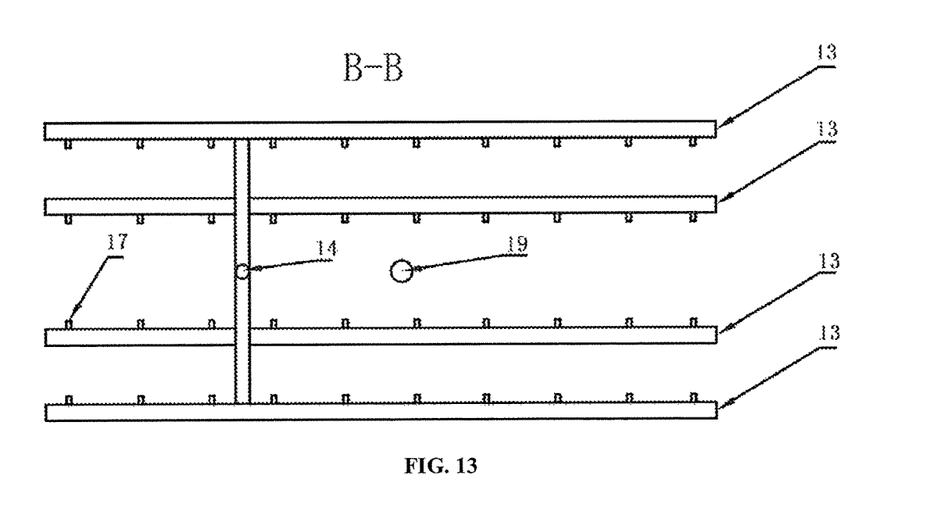
FIG. 13 is a sectional view along B-B shown in FIG. 12.
Figure 14:
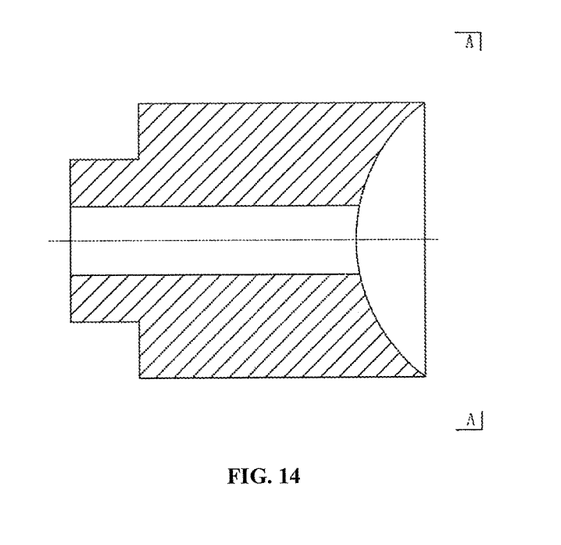
FIG. 14 is a schematic structural diagram of a sprayer.
Figure 15:
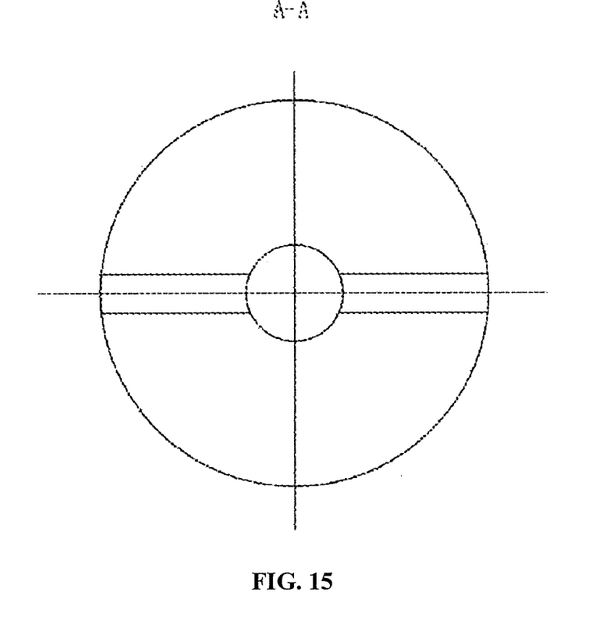
FIG. 15 is a sectional view along A-A shown in FIG. 14.

As shown in FIG. 9, an inner bottom surface of the electric desalter 7 is clad with an automatic sand removal plate 9, the inner bottom surface including a bottom surface sealed at two ends. The automatic sand removal plate 9 is a thin PTFE plate, or is spray-coated with PTFE. The arc length of the thin PTFE plate or the PTFE coating is about ¼ of the perimeter of the electric desalter. The thickness of the thin PTFE plate or the PTFE coating is determined according to a degree at which silt and mechanical impurities that have settled abrade the surface of the automatic sand removal plate, and according to designed service life. The thin PTFE plate may be adhered to the bottom surface of the electric desalter 7 after its surface is treated. Alternatively, as shown in FIG. 10 and FIG. 11, several bolts 10 may be welded at the bottom of the electric desalter, and the thin PTFE plate is pressed at the bottom of the electric desalter by using nuts 11 and a press plate 12. Referring to FIG. 9, FIG. 12 and FIG. 13, several groups of backwash pipes 13 are mounted at the bottom of the electric desalter, the length of each group being 2.5 m to 3.5 m. The number of the backwash pipe groups is specifically determined according to the length of the electric desalter. Several columns of backwash pipes 13 are provided on each backwash pipe group, and the backwash pipes 13 are all connected to a backwash inlet pipe 14. Electric or pneumatic on/off valves 15 are mounted outside the backwash inlet pipe 14, and each of the electric or pneumatic on/off valves 15 is connected to a water outlet of a backwash pump 16 through a pipeline. The backwash pipes 13 are mounted closely attached to the automatic sand removal plate 9, and an interval between the bottom of each backwash pipe 13 and the automatic sand removal plate 9 is about 25 mm. Several sprayers 17 are welded on each backwash pipe 13, and are spaced at 300 mm to 400 mm. A geometrical shape of each sprayer is shown in FIG. 14 and FIG. 15. An included angle between each sprayer and the horizontal line is 30° to 60°. A pipe diameter of each backwash pipe 13 is calculated according to a flow quantity and a flow rate of backwash water. A water outlet 19 is disposed at the very bottom of the electric desalter and located at the middle of each backwash pipe group, and an anti-vortex baffle 18 is disposed in the water outlet 19. A set of ultrasonic sludge interface instruments 20 is mounted on any end of the bottom of the electric desalter, about 1.5 meters above the water outlet 19. To ensure the reliability of control, another set of ultrasonic sludge interface instruments 20 may further be mounted at another suitable position, where a specific number may be determined according to the length of the electric desalter. A sonar principle is used for the ultrasonic sludge interface instruments 20. An ultrasonic transducer under the water emits an ultrasonic pulse to the water vertically. Because suspended particulates settle in the water to form a sludge layer, the pulse is reflected by the surface of the sludge layer and is received by the transducer. The speed at which an ultrasonic wave travels in water is known, and then the instrument can detect the time for which the pulse is reflected back from a sludge interface. In this way, a transmitter may calculate a distance from the surface of the transducer to the sludge interface, to know the thickness of the sludge layer. When the thickness of the sludge layer reaches a set thickness, an automatic control system enables a backwash system, to flush the bottom of the electric desalter in sections through the backwash pipes 13 and by switching on/off the electric or pneumatic on/off valves 15 at different positions. Then, silt that is stirred up is discharged out of the electric desalter through the water outlets 19. Each of the ultrasonic sludge interface instruments 20 needs to be mounted perpendicularly to the water surface, and there should be no other blocking solid object between the ultrasonic sludge interface instrument and the bottom of the electric desalter; otherwise, an interference signal is produced. The transducer of the ultrasonic sludge interface instrument should avoid being hit by a floating object in the water. The ultrasonic sludge interface instrument is mounted at about 200 mm underwater, and is kept from a wall of the electric desalter at a distance not less than 300 mm.

In a desalting and dehydration process of crude oil, suspended particulates such as silt and mechanical impurities contained in the crude oil settle on the automatic sand removal plate 9 at the bottom of the electric desalter. The automatic sand removal plate 9 is made of PTFE. Because PTFE has a characteristic that no substance can stick to PTFE and has a superior self-lubrication property, the silt and mechanical impurities that settle on the automatic sand removal plate 9 at the bottom of the electric desalter can be discharged out of the electric desalter with saline wastewater through the water outlet 19 at the bottom of the electric desalter. A thick sludge layer is unlikely to deposit at the bottom of the electric desalter. Because the anti-vortex baffle 18 is disposed in the water outlet 19, vortices are not produced while the saline wastewater is discharged, and therefore the sludge layer at the bottom of the electric desalter is not disturbed. When the ultrasonic sludge interface instrument 20 detects that some stubborn silt and mechanical impurities that deposit at the bottom of the electric desalter reach the set thickness, the automatic control system switches on the backwash pump 16, to flush the bottom of the electric desalter 7 with water in sections through the backwash pipes 13 and by switching on/off the electric or pneumatic on/off valves 15. Under the disturbance of the backwash water, the silt and mechanical impurities that deposit on the automatic sand removal plate 9 at the bottom of the electric desalter are stirred up, and are discharged out of the electric desalter 7 with the saline wastewater through the water outlet 19 at the bottom of the electric desalter.

In this embodiment, the bottom of the electric desalter is clad with the automatic sand removal plate 9. Thus, after the silt and mechanical impurities in the crude oil settle on the automatic sand removal plate 9 at the bottom of the electric desalter, they are easily discharged out of the electric desalter with the saline wastewater. The silt and mechanical impurities rarely deposit on the automatic sand removal plate 9 at the bottom of the electric desalter, thus reducing the frequency of backwashing. Because the anti-vortex baffle 18 is disposed in the water outlet 19, vortices are not produced while the saline wastewater is discharged, and therefore the sludge layer at the bottom of the electric desalter is not disturbed. Even when there is sediment of suspended matters such as the silt and mechanical impurities at the bottom of the electric desalter, the ultrasonic sludge interface instrument 20 can perform detection on line. When the ultrasonic sludge interface instrument 20 detects that the sludge layer at the bottom of the electric desalter reaches the set thickness, the automatic control system switches on the backwash pump 16, to flush the bottom of the electric desalter with water in sections through the backwash pipes 13 and by switching on/off the electric or pneumatic on/off valves 15. Under the disturbance of the backwash water, the silt and mechanical impurities that deposit on the automatic sand removal plate 9 at the bottom of the electric desalter are stirred up, and are discharged out of the electric desalter 7 with the saline wastewater through the water outlet 19 at the bottom of the electric desalter.

Embodiment 4

The only difference between this embodiment and Embodiment 2 is that, the apparatus of this embodiment further includes a bottom automatic sand flushing device described in Embodiment 3.

Figure 16:
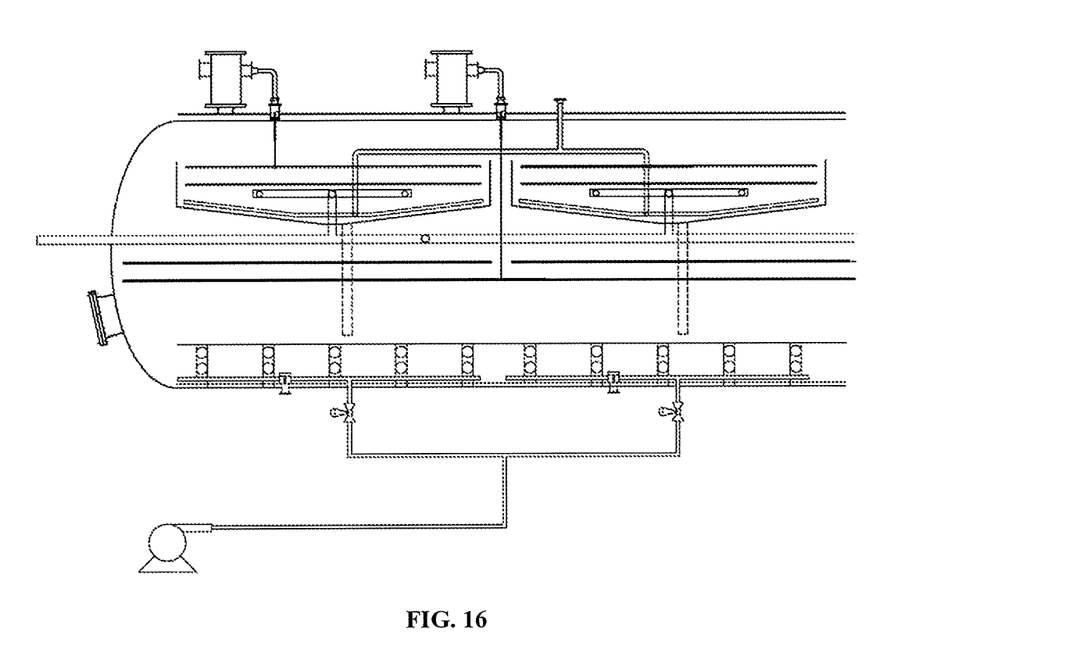
FIG. 16 is a schematic structural diagram of Embodiment 4 of the implementation model.

A schematic structural diagram thereof is shown in FIG. 16.

By using the electric desalting and dehydration apparatus of this embodiment, it can be ensured that the operation of an electric desalting apparatus with double oil inlets and double electric fields meets required technical indicators. The apparatus can remove silt and mechanical impurities from the bottom of an upper water tray; ensure a continuous, normal, and stable operation of an upper electric field; and ensure a desalting effect of the upper electric field, such that the treated crude oil meets the technical indicators, and an oil content in discharged wastewater reaches or is higher than the standard. In addition, the sediment of the silt and mechanical impurities on an automatic sand removal plate at the bottom of the electric desalter is reduced, and the frequency of backwashing is reduced accordingly. Moreover, the apparatus can automatically detect the thickness of a sludge layer at the bottom of the electric desalter on line, and automatically enable a backwash system to perform flushing, such that the electric desalting apparatus can normally operate for a long cycle, and the oil content in the discharged wastewater reaches the standard, thus reducing environmental pollution and saving the petroleum resource.

What is claimed is:

1. An electric desalting and dehydration apparatus, comprising an oil inlet distributor of an upper electric field, wherein the oil inlet distributor comprises oil inlet distributing pipes and an oil inlet branch pipe; the oil inlet distributing pipes are arranged in a water tray of an electric desalter, and below a ground electrode of the electric desalter; the oil inlet branch pipe is connected to the oil inlet distributing pipes to supply crude oil into the oil inlet distributing pipes; and the oil inlet distributing pipes are provided with oil outlets on both sides of the oil inlet distributing pipes in a horizontal direction;

wherein the electric desalting and dehydration apparatus further comprises an upper-field water-tray automatic sand flushing device; the upper-field water-tray automatic sand flushing device is connected to the water tray in the electric desalter, and comprises an automatic sand removal plate, a backwash inlet pipe, backwash pipes, sprayers, and a downpipe; the automatic sand removal plate is provided on an upper side of a bottom surface of the water tray and below the oil inlet distributing pipes; the water tray is V-shaped, and correspondingly, a trough is formed at the bottom of the water tray; the backwash pipes are provided above the automatic sand removal plate, and the sprayers are evenly distributed on each backwash pipe; the backwash inlet pipe is connected to the backwash pipes to supply water to the backwash pipes; and the downpipe is connected to the trough at the bottom of the water tray.

2. The electric desalting and dehydration apparatus according to claim 1, further comprising a bottom automatic sand flushing device, wherein the bottom automatic sand flushing device is provided at the bottom of the electric desalter, and comprises an automatic sand removal plate, a backwash pipe group, a backwash inlet pipe, an on/off valve, sprayers, an ultrasonic sludge interface instrument, and an automatic control system; the automatic sand removal plate is fixedly provided at the bottom of an inner wall of the electric desalter; the backwash pipe group is provided inside the electric desalter and above the automatic sand removal plate, and comprises several backwash pipes; the sprayers are evenly provided on each of the backwash pipes; the backwash inlet pipe is connected to the backwash pipes; the on/off valve is provided in the backwash inlet pipe; the ultrasonic sludge interface instrument is provided at the bottom of the electric desalter, and is used for detecting the thickness of silt that settles in the electric desalter; the ultrasonic sludge interface instrument and the on/off valve are both in signal connection with the automatic control system; and when the ultrasonic sludge interface instrument detects that the thickness of the silt that settles at the bottom of the electric desalter exceeds a threshold, the automatic control system switches on the on/off valve, to flush the silt at the bottom of the electric desalter.

3. The electric desalting and dehydration apparatus according to claim 1, wherein the oil inlet distributing pipes are symmetrically distributed about a radial central line of the water tray, and one or two oil inlet distributing pipes are arranged on each side.

4. The electric desalting and dehydration apparatus according to claim 1, wherein the diameter of each of the oil outlets is less than that of the oil inlet distributing pipe.

5. The electric desalting and dehydration apparatus according to claim 1, wherein several groups of oil inlet distributing pipes are arranged according to the length of the electric desalter, and are respectively located in each of the several water trays of the electric desalter.

6. The electric desalting and dehydration apparatus according to claim 1, wherein the automatic sand removal plate is a thin polytetrafluoroethylene (PTFE) plate, and the automatic sand removal plate is adhered to the bottom surface of the water tray.

7. The electric desalting and dehydration apparatus according to claim 1, wherein several bolts are welded at the bottom of the water tray, and the automatic sand removal plate is fixedly disposed at the bottom of the water tray by using nuts and a press plate.

8. The electric desalting and dehydration apparatus according to claim 1, wherein the backwash pipes are symmetrically distributed about a radial central line of the water tray, and two or more backwash pipes are arranged on each side.

9. The electric desalting and dehydration apparatus according to claim 1, wherein an anti-vortex baffle is disposed at a top end of the downpipe.

* * * * *